Figure 1:
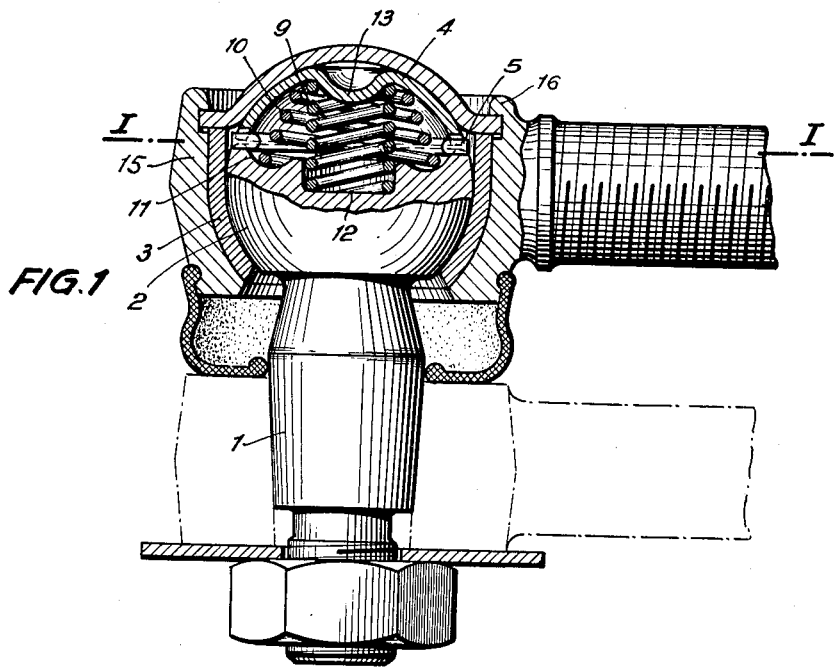

Jan. 31, 1956  J. H. LATZEN  2,733,087
BALL AND SOCKET JOINT
Filed March 5, 1952

INVENTOR
JOSEF LATZEN

BY Robert H. Jacob
AGENT

United States Patent Office 2,733,087
Patented Jan. 31, 1956

2,733,087
BALL AND SOCKET JOINT

Josef Hubert Latzen, Oberkassel, Dusseldorf, Germany, assignor to A. Ehrenreich & Cie, Dusseldorf-Oberkassel, Germany, a firm Application March 5, 1952, Serial No. 274,898

3 Claims. (Cl. 287—90)

This invention relates to a ball and socket or universal joint, in which a body in the form of a section of a sphere and attached to a pin is resiliently supported on a correspondingly spherical surface of the socket.

An object of the invention is to provide a joint of this kind which, in spite of the fact that the said body is in the form of a portion of a sphere, is efficient and well able to resist stresses in the direction of the axis of the pin, high specific surface pressure being avoided.

According to the invention, the said body having the form of a portion of a sphere at the end of the pin is extended by means of a hollow cap, the external surface of which forms a continuation of the spherical surface of said body, and spring means is provided between the said body and a cover for the socket, the shape of which cover conforms to the shape of the hollow cap. By this means a ball and socket joint is obtained in which the said stresses are taken by the large surface of the hollow cap, without the efficiency or movability of the joint being appreciably impaired. If a gap is left between the hollow cap and the surface of the body which faces the cap, the joint may be given a certain amount of play in the direction in which the spring means acts. Further, owing to the provision of the hollow cap, a large space for the storage of lubricant is provided in the joint.

The hollow cap may consist of a shell which forms a head for the said body, the spring means being then interposed between the shell and the adjacent face of the body. In this case the body is enlarged by the hollow shell to form a substantially complete sphere, which is resiliently supported in the axial direction of the pin.

It is advisable to secure the hollow cap against rotation relative to the body attached to the end of the pin. This avoids any danger, if the spring means are in the form of a coil spring, of the turns being wound up or unwound owing to relative movement between the cap and the body. Any undesirable friction between the end of the turns of the spring and the cap is also prevented.

It is also advisable to provide the hollow shell with a central indentation to act as a guide for the spring, which may be a coil spring, and to locate the spring in its proper position.

Similarly, it is of advantage to hollow out the end face of the body attached to the pin for the reception of one end of the spring. This also locates the spring in proper position on the said body.

If there are used two springs having a common axis, of which one spring surrounds the other, the end face of the said body attached to the pin may have an annular recess for the reception of one end of the outer spring. This recess, in addition to securing the spring in position, also prevents the two springs approaching and interfering with one another.

The hollow cap can also be formed by a lateral extension of a sleeve which is inserted centrally in the end face of the body attached to the pin. In this case, when the spring means are in the form of two springs, the inner spring is disposed in the sleeve and the outer spring surrounds the sleeve.

Advantageously the inner spring is of cylindrical form, whereas the outer spring decreases in diameter from the end face of the said body towards the cap. By this means regard is paid to the fact that the stresses which tend to move the springs in pendulum fashion due to the deflections of the joint, act less strongly on the middle spring, and the outer spring, which is subjected to greater stress, is able better to resist these stresses owing to its special shape.

The outer spring, which is in the form of a truncated cone, can have one end bent to engage in coinciding grooves in the edge of the hollow cap and in the end face of the body attached to the pin, so that the hollow cap is secured against rotation by means of the outer spring.

It is also of advantage to allow the turns of the one spring to run in the opposite direction to the turns of the other spring. In this way the one spring counteracts the winding and unwinding of the other spring.

For introducing lubricant, an ordinary lubricating nipple can be provided on the socket or on its cover, in which case holes in the hollow cap can allow access of lubricant to the space enclosed by the cap. The introduction of lubricant can also take place through the pin from below or from one side of the socket. By means of a rubber casing which encloses the joint, the escape of lubricant at the place where the pin enters the socket can be prevented and on the other hand a permanent store of lubricant can be maintained in the joint.

The drawing illustrates two constructional examples of a ball and socket joint in accordance with the invention.

Figure 1 shows in cross-section a ball and socket joint in which the body attached to the joint pin is provided with a hollow cap which enlarges the said body so that it becomes a substantially complete sphere.

Figure 2:
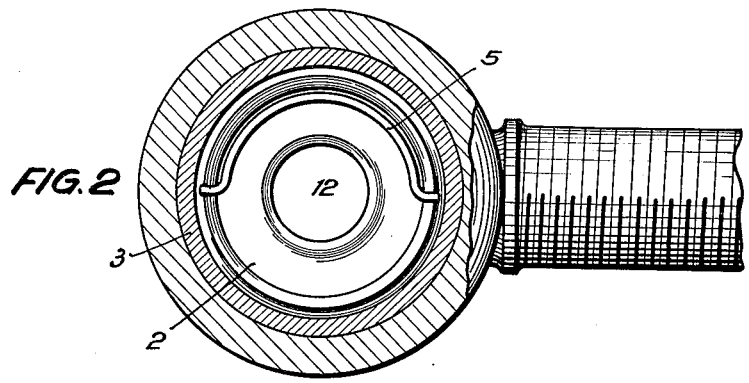
Figure 3:
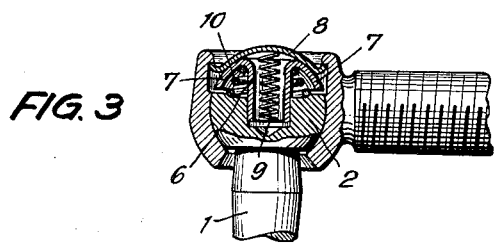

Figure 2 shows in sectional plan on the line 1—1 of Figure 1, the means for securing the hollow cap against rotation relative to the body attached to the pin; and Figure 3 shows a ball and socket joint in which a central sleeve having a lateral spherical extension is inserted in the body attached to the pin, the said extensions being guided in corresponding arched portions of the cover of the socket.

In all figures, the numeral 1 designates the joint pin and the numeral 2 the spherical section which constitutes the ball and is attached to the pin 1.

In Figure 1 the spherical section 2 is disposed in a hollow shell which is inserted in the socket 15 and is hardened and made of wear-resistant material. The spherical section 2 is enlarged by a cap 4 to form a substantially complete sphere. A clip 5, of which the ends engage in coinciding recesses in the spherical section 2 and the hollow cap 4, secures the cap against rotation relative to the spherical section 2. A certain amount of play is left between the hollow cap and the adjacent surface of the spherical section 2.

In the constructional example according to Figure 3, a central sleeve 6 is inserted in the spherical section 2 and is displaceable therein. The upper edge of the sleeve is extended to form spherical surfaces 7. The cover 8 of the socket is arched to conform to these spherical surfaces.

The joints, which are illustrated by way of example, are provided with two coil springs 9 and 10, of which the inner spring 9 is of cylindrical form, whereas the diameter of the turns of the outer spring 10 decreases in a direction away from the spherical section 2, so that the outer spring has the form of a cone. Naturally, the joint may be provided with only one spring instead of two.

In the constructional example shown in Figure 1, an annular recess 11 is formed in the upper surface of the spherical section 2 for the reception of one end of the outer spring, and a central recess 12 is formed in said surface for the reception of the inner spring. The hollow cap is internally arched, as shown at 13, to provide a seat for the inner spring. The cover 14 of the socket 15 is arched to correspond to the curvature of the hollow cap 4 and is held in place by the peened over rim of the socket.

In the example of Figure 3, the inner spring is arranged in the central sleeve 6, whereas the outer spring 10 surrounds the central sleeve.

I claim:

1. A ball and socket joint comprising a stud having an enlarged portion constituting a head presenting a segmental spherical surface, a socket presenting a spherical inner surface providing bearing support for said head, a hollow cap disposed over said head with a space therebetween presenting an outer spherical surface defining a substantially continuous and unobstructed spherical surface with said head, a cover on said socket presenting a spherical inner surface providing sliding bearing engagement for said cap, and spring means extending from said head toward said cover, said hollow cap having an inwardly projecting conformation maintaining said spring means substantially in axial alignment with said stud and said head, said head being movable relative to said cap against the action of said spring means, said head having a recess in alignment with said inwardly projecting conformation on said cap wherein one end of said spring means is disposed, and said spring means comprising concentric inner and outer helical springs of cylindrical and conical conformation, respectively, effective to absorb axial and angular thrusts, respectively.

2. A ball and socket joint comprising a stud having an enlarged portion constituting a head presenting a segmental spherical surface, a socket presenting a spherical inner surface providing bearing support for said head, a hollow cap disposed over said head with a space therebetween presenting an outer spherical surface defining a substantially continuous and unobstructed spherical surface with said head, a cover on said socket presenting a spherical inner surface having bearing engagement with said cap, and spring means extending from said head toward said cover, said hollow cap having an inwardly projecting conformation maintaining said spring means substantially in axial alignment with said stud and said head, said head being movable relative to said cap against the action of said spring means, said head having a recess in alignment with said inwardly projecting conformation on said cap wherein one end of said spring means is disposed, said spring means comprising concentric inner and outer helical springs of cylindrical and conical conformation, respectively, and said head having a circumferential ridge, diagonally opposite and coinciding recesses in said ridge and in said cap, and a semicircular clip disposed within said ridge and having outwardly projecting ends disposed in said coinciding recesses.

3. A ball and socket joint comprising a stud having an enlarged portion constituting a head presenting a segmental spherical surface, a socket presenting a spherical inner surface providing bearing support for said head, a hollow cap disposed over said head with a space therebetween presenting an outer spherical surface defining a substantially continuous and unobstructed spherical surface with said head, a cover on said socket presenting a spherical inner surface having bearing engagement with said cap, and spring means extending from said head toward said cover, said hollow cap having an inwardly projecting conformation maintaining said spring means substantially in axial alignment with said stud and said head, said head being movable relative to said cap against the action of said spring means, said head having a recess in alignment with said inwardly projecting conformation on said cap wherein one end of said spring means is disposed, said spring means comprising concentric inner and outer helical springs of cylindrical and conical conformation, respectively, and wound in opposite directions, and said inwardly projecting conformation being cylindrical and extending into said recess.

References Cited in the file of this patent

UNITED STATES PATENTS

| 1,770,846 | Dahlquist | July 15, 1930 |
| 2,108,814 | Flumerfelt | Feb. 22, 1938 |
| 2,147,815 | Hufford | Feb. 21, 1939 |
| 2,205,981 | Klages | June 25, 1940 |
| 2,281,097 | Flumerfelt | Apr. 28, 1942 |

FOREIGN PATENTS

| 545,897 | Great Britain | of 1942 |
| 920,900 | France | of 1947 |